United States Patent [19]

Sakamoto

[11] Patent Number: 5,734,131
[45] Date of Patent: Mar. 31, 1998

[54] SPEAKER MOUNT STRUCTURE OF VEHICLE

[75] Inventor: Yoshio Sakamoto, Hachiouji, Japan

[73] Assignee: Kabushiki Kaisha Kenwood, Tokyo, Japan

[21] Appl. No.: 731,053

[22] Filed: Oct. 9, 1996

[30] Foreign Application Priority Data

Oct. 18, 1995 [JP] Japan .................. 7-269637

[51] Int. Cl.⁶ .................................................. H05K 5/00
[52] U.S. Cl. ........................................ 181/141; 181/150
[58] Field of Search .............................. 181/141, 150, 181/171, 199; 381/87, 88, 86, 188, 205; 248/27.1; 296/70

[56] References Cited

U.S. PATENT DOCUMENTS

| | | | |
|---|---|---|---|
| 3,267,993 | 8/1966 | Shimizu et al. | 248/27.1 |
| 4,056,165 | 11/1977 | Okamoto et al. | 181/141 |
| 4,847,907 | 7/1989 | Ando | 381/86 |
| 4,993,510 | 2/1991 | Kato et al. | 181/141 |

Primary Examiner—Khanh Dang
Attorney, Agent, or Firm—Sixbey, Friedman, Leedom & Ferguson, P.C.; Gerald J. Ferguson, Jr.; Eric J. Robinson

[57] ABSTRACT

Abnormal sounds such as kinky sounds are prevented from being generated from a vehicle mount speaker when it is mounted on a door panel or the like. The vehicle mount speaker is mounted on a vehicle interior decorative panel or the like, the speaker is provided with projection-shaped support shafts on the back of the speaker near at the speaker flange, and the support shafts are coupled directly or via a cushioning member to the vehicle iron plate or the like.

14 Claims, 9 Drawing Sheets

SPEAKER MOUNT STRUCTURE OF VEHICLE

BACKGROUND OF THE INVENTION

1. Field of the Invention

The present invention relates to a speaker mount structure of a vehicle, and more particularly to a speaker mount structure in which a light and thin speaker, such as a speaker with a repulsion magnetic circuit, is mounted on an interior decorative panel, a door panel, or the like of a vehicle, and the panel with the speaker mounted thereon is mounted to a vehicle body, a door, or the like.

2. Related Background Art

One of the advantages of a conventional vehicle speaker mount structure, such as the mount structure of a speaker on a door panel or inner decorative panel, is as follows. Wiring to switches and the like for a power window mounted on the door panel or the like and wiring to a speaker can be collectively processed. Therefore, the speaker and switches and the like of the power window can be assembled with the door panel or the like and can be formed into one module. This module of the panel is mounted on a vehicle so that the number of mount processes can be reduced. However, in practice, a speaker is not mounted on an inner decorative panel, a door panel, or the like from the following reasons.

A general vehicle door panel will be described byway of example. Many door panels are about 3 to 4 mm thick and are made of resin such as FRP or pulp compressed plate called a hard board. Many conventional speakers such as 5 inch or 6.5 inch speakers have an average weight of about 550 g to 750 g. The strength of a door panel is insufficient for mounting such a heavy speaker. If such a vehicle speaker is mounted on the door panel by using screws or the like generally used for mounting speakers, large shocks upon door open/close or during running are applied to the speaker to dismount it. Therefore, screws may be loosened or removed, and the mount portion may be broken to drop the speaker down.

It is well known that a baffle plate with a general audio speaker mounted thereon is required to have a thickness sufficient for not generating abnormal sounds such as kinky sounds even if a large signal is input. Although a sufficiently thick baffle plate can be used for audio speakers in home use, a door panel or inner decorative panel used for a baffle of a vehicle audio speaker has an insufficient strength because the panel is thin. Therefore, abnormal sounds such as kinky sounds are likely to be generated near at the speaker mount area when a large signal is input, as well known in the art.

In order to avoid such inconveniences as speaker dismount and abnormal sound generation, not only the speaker mount area is required to be reinforced, but also the strength of the panel is required to be increased by making the panel thick. However, such countermeasure results in a large cost. From the above reasons, as shown in FIG. 9, generally a present speaker mount structure mounts a speaker directly or via a bracket made of resin injection mold or iron press mold, on a vehicle frame made of iron such as a door.

With such a mount structure, however, if a panel is mounted in tight contact with, or too near the speaker frame, the panel may resonate and abnormal sounds such as kinky sounds are likely to be generated. It is therefore necessary that the panel and speaker have a space therebetween sufficient for not generating abnormal sounds. In this state, a space is formed between the panel and the frame on which the speaker diaphragm is mounted and sounds radiated from the diaphragm enter this space and are difficult to sufficiently transmit toward a listener outside of the panel.

In the conventional mount structure shown in FIG. 9, in order to avoid such inconveniences and absorb size errors when a panel is mounted on the iron door plate, an elastic ring gasket G made of urethane foam or the like is mounted on a frame flange 1f1. This mount structure is used from the above reasons regardless of that the structure is not proper for the sound quality and characteristics of a speaker 1, as well known in the art. As well known, although a door panel or inner decorative panel 3 is useful for decoration of the vehicle room, it has hardly a function of supporting the weight of the speaker 1.

Recent speakers are becoming light and thin. The present inventors have proposed a light and thin speaker. This speaker of 6.5 inch diameter is 150 g to 130 g reducing the weight of about 750 g of a conventional speaker by 80% or more, and has a mounting depth of about 25 mm thinning the thickness of about 50 mm of a conventional speaker by about 50%. It can be easily thought that such a thin and light speaker 1 mounted on a door panel or inner decorative panel 3 can alleviate conventional inconveniences.

It has been found, however, the following problems associated when such a thin and light speaker 1 is mounted on the door panel or interior decorative panel 3 and the door panel or interior decorative panel 3 with the speaker is mounted on an iron door plate or vehicle iron plate F. Specifically, a thin iron press frame 1f, a thin aluminum press frame 1f, or the like has an insufficient strength. When the door panel or interior decorative panel 3 with the speaker 1 is mounted on the frame 1 by using fixing screws b with an air driver or the like, not only deflected force is applied to the frame flange 1f1 but also pressure applied to the screw head may deform the flange near at a fixing hole 1f3. This deformation may hinder a mount work of a grille 2 of the speaker 1.

To eliminate this deflected force, generally threading the screws b is stopped just before they are completely threaded, i.e., just before the heads of the screws b contact the flange 1f1. Thereafter, each screw b is slowly threaded to average the force applied to the flange 1f1 and avoid deflected force. Even with this work, deformation of the flange near at the fixing hole 1f1 is inevitable unless the threading torque is made weak. In a mount state with a weak threading torque, abnormal sounds such as kinky sounds are inevitably generated when a large signal is input.

It has been also found that even with a large threading torque, abnormal sounds are generated greatly at a practical signal level although they depend on the shape, material, and the like of the door panel or interior decorative panel 3.

It is therefore an object of the present invention to provide a speaker mount structure in which even if a light and thin speaker is mounted with a strong threading torque on an interior decorative panel or door panel, deformation of the frame flange can be avoided, and even if the door panel or interior decorative panel with the speaker mounted thereon is mounted on a vehicle iron plate or iron door plate, abnormal sounds such as kinky sounds can be completely eliminated or suppressed to a practically allowable level.

According to the speaker mount structure of this invention, a projection-shaped support shaft is provided which protrudes near at the speaker flange from the back of the panel with the speaker. The support shaft couples directly, or via a cushioning member made of rubber or the like, to a partial area of a vehicle iron plate or iron door plate. With this mount structure, abnormal sounds such as kinky sounds to be generated from a panel during the operation of the speaker can be avoided. With this mount structure, the speaker frame is squeezed between a speaker grille and a vehicle door panel or interior decorative panel.

The projection-shaped support shaft is provided at the position where the speaker is mounted on the panel, for example, at the position near the speaker flange. The support shaft couples directly, or via the cushioning member made of rubber or the like, to a partial area of the vehicle iron plate or iron door plate. With this mount structure, the support shaft is mounted between the interior decorative panel or door panel and the vehicle iron plate or iron door plate. Accordingly, the speaker mount area of the panel, i.e., the baffle, functions as if it is thickened and the mechanical strength is increased greatly. By properly disposing the projection-shaped support shaft, the structure preventing resonance of the thin panel can be achieved and the kinky sounds can be efficiently alleviated.

Since the speaker frame is squeezed between the speaker grille and the vehicle interior decorative panel or door panel, the heads of frame fixing screws do not directly contact the frame as in the conventional case. Specifically, since the screws are threaded via the grille and panel, local pressure to be caused by the screw head is dispersed to the grille and panel. Further, since the pressure to the frame flange is averaged, deformation of the frame can be avoided.

SUMMARY OF THE INVENTION

It is an object of the present invention

DETAILED DESCRIPTION OF THE PREFERRED EMBODIMENTS

Embodiments of the invention will be described with reference to FIGS. 1A to 8B. Components common to those shown in FIG. 9 have the same structure as described previously, and so they are not described in duplicate. A speaker 1 used with the embodiments will be described with reference to FIGS. 1A–1B. A speaker frame 1f has a maximum outer diameter of 159 mm and a height of 40 mm and is made of a press molded aluminum plate of 1 mm thick. This speaker frame 1f is generally called a 6.5 inch diameter frame. The outer periphery at the maximum outer diameter portion is provided with a protrusion of 7.2 mm high, and a flange 1f1 of about 16 mm wide is formed at the inner side of the flange 1f1. The flange 1f1 is formed with three mount holes 1f3 of 5.5 mm diameter for mounting the speaker 1 on a baffle or the like. The three mount holes 1f3 are radially positioned at a pitch of 120 degrees and remotely from the center of the frame 1f by 142 mm.

The inner diameter of the flange 1f1 is 122 mm. A fall portion of 4 mm deep is formed contiguously with the inner diameter portion of the flange 1f1. A flat ring portion of about 6.3 mm wide generally called a damper seat is formed at the position lower by 25 mm from the fall portion. An slanted fall portion of 9 mm deep is formed contiguously with the inner diameter portion of the damper seat. The lowest end of the slanted fall portion is contiguous with a frame bottom 1f2 of about 50 mm diameter. A frame bottom hole of 33 mm diameter is formed in the frame bottom 1f2 at the central area thereof, i.e., at the central area of the frame 1f. Four holes of 4.5 mm diameter for mounting a magnetic holder 1h are formed in the frame bottom 1f2 near the frame bottom hole, radially at a pitch of 90 degrees and remotely from the center of the frame 1f by 45 mm.

Figure 1A:
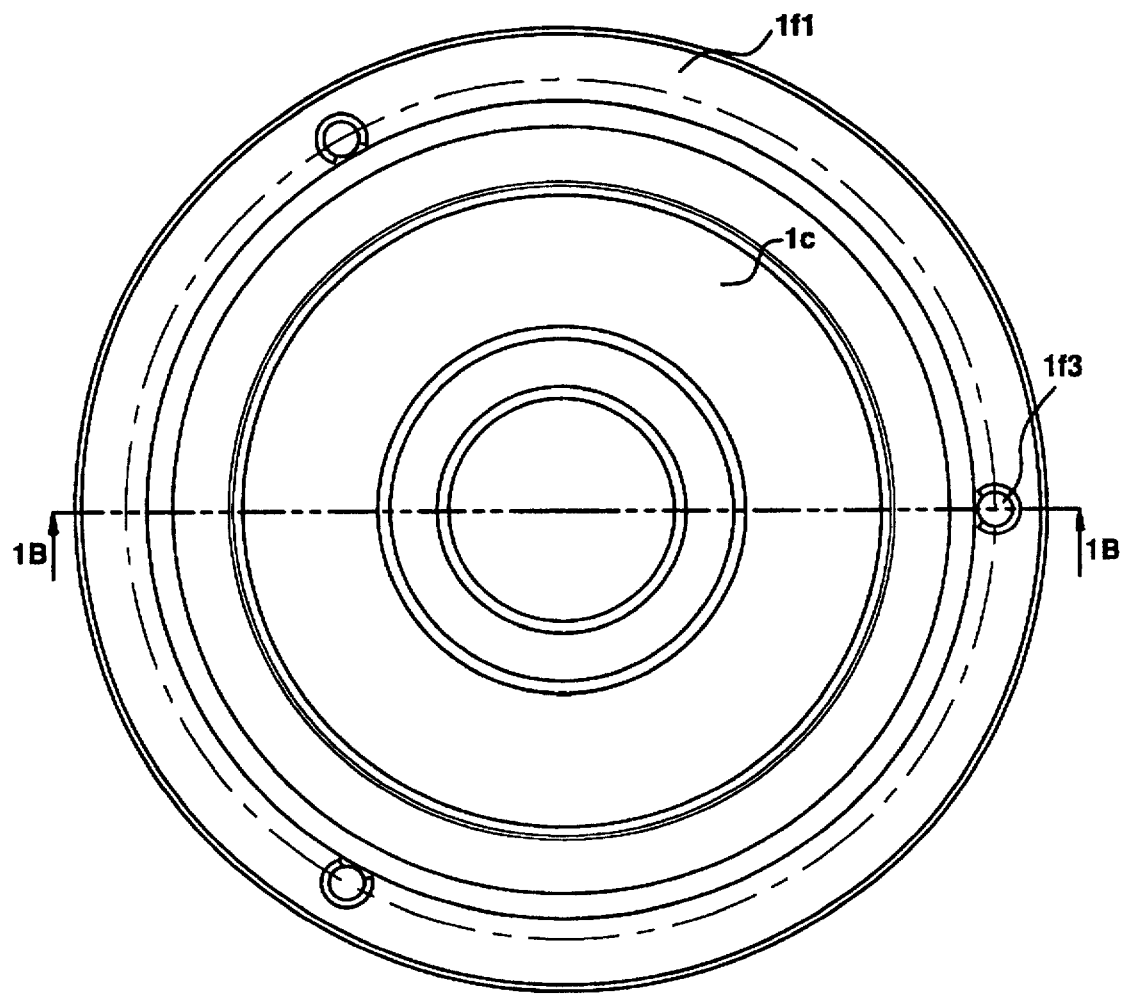
FIG. 1A is a front view of a speaker according to an embodiment of the present invention and FIG. 1B is a cross sectional view taken along line A—A of FIG. 1A.
Figure 1B:
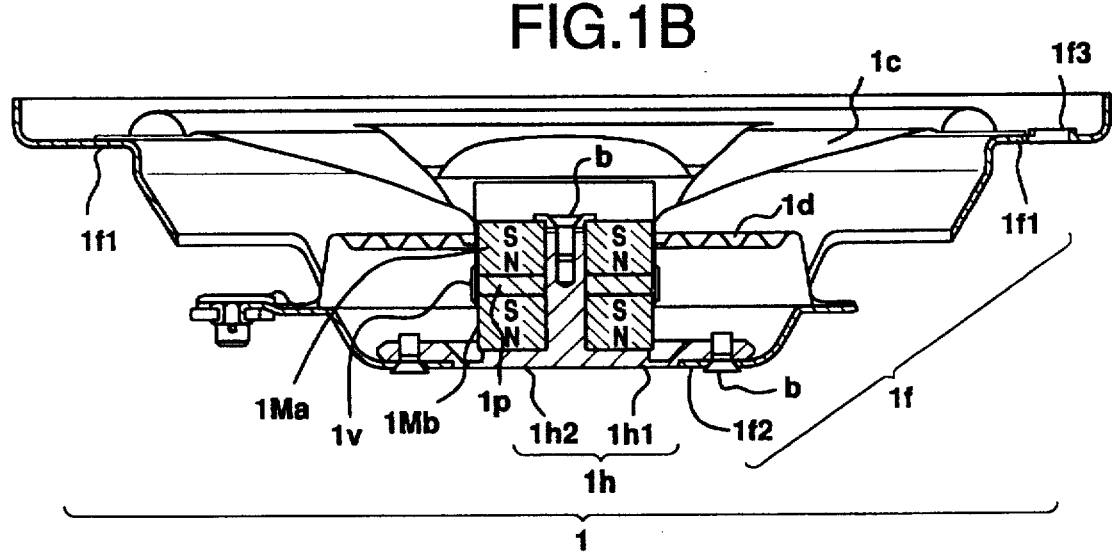
Figure 4A:
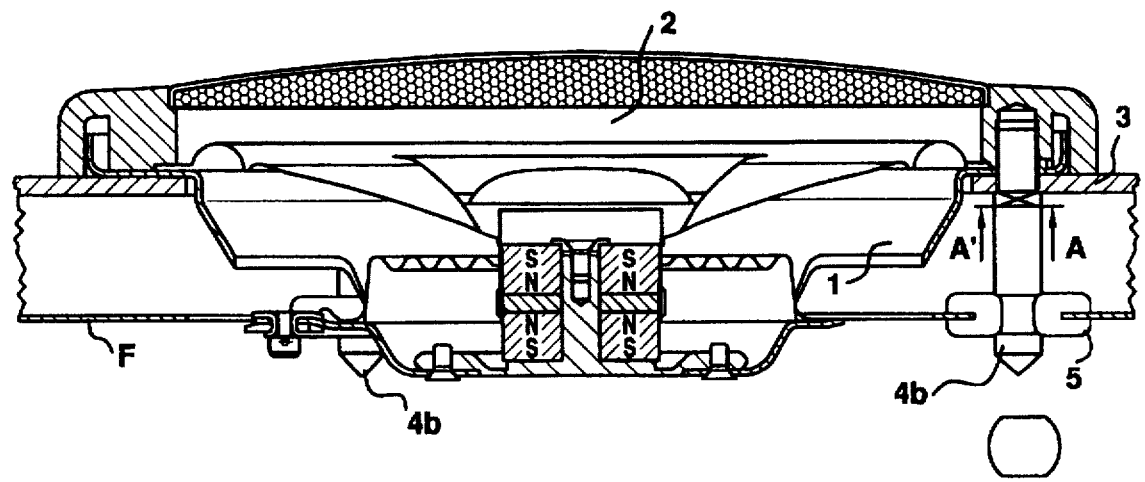
FIG. 4A is a cross sectional view showing the state of the speaker of the embodiment and FIG. 4B is a plan view of the mount state as viewed from the back of the speaker.
Figure 4B:
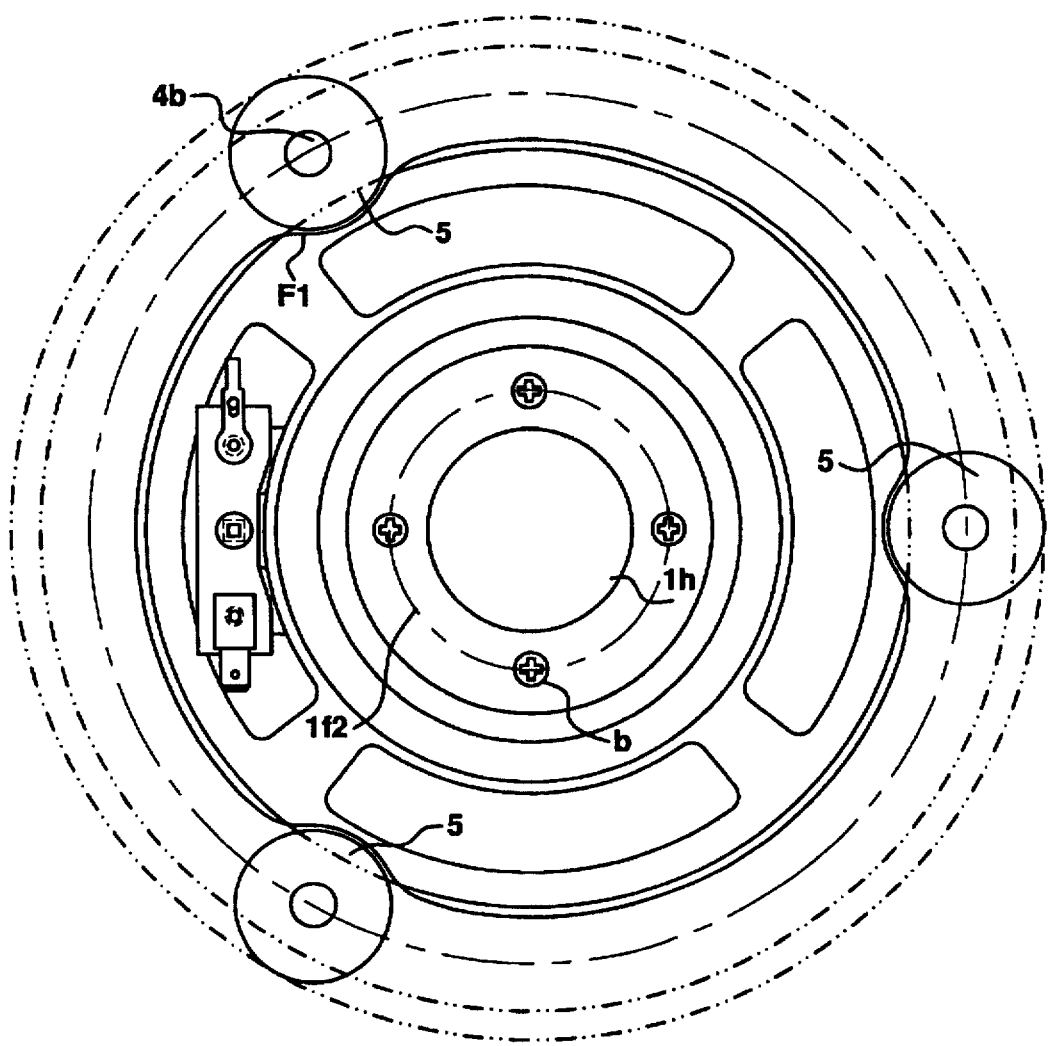
Figure 5A:
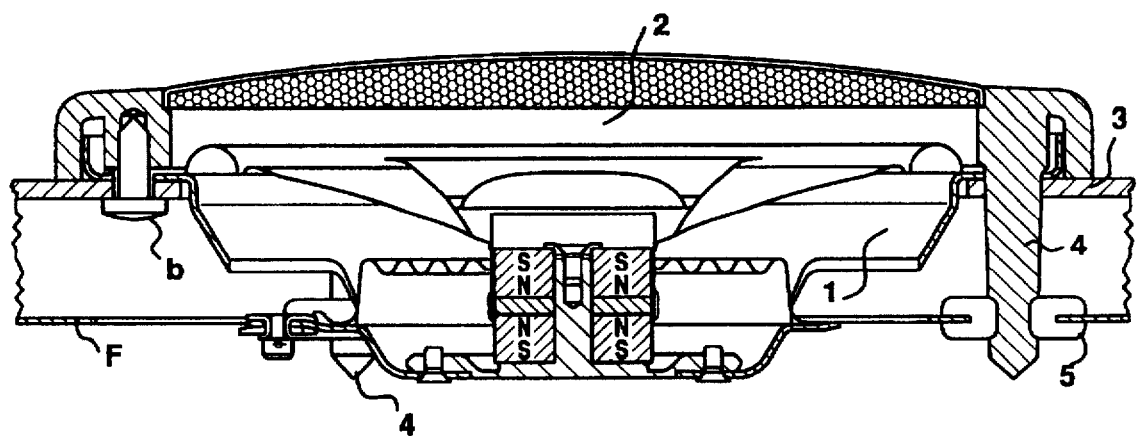
FIG. 5A is a cross sectional view showing the mount state of a speaker according to another embodiment of the invention and FIG. 5B is a plan view of the mount state as viewed from the back of the speaker.
Figure 5B:
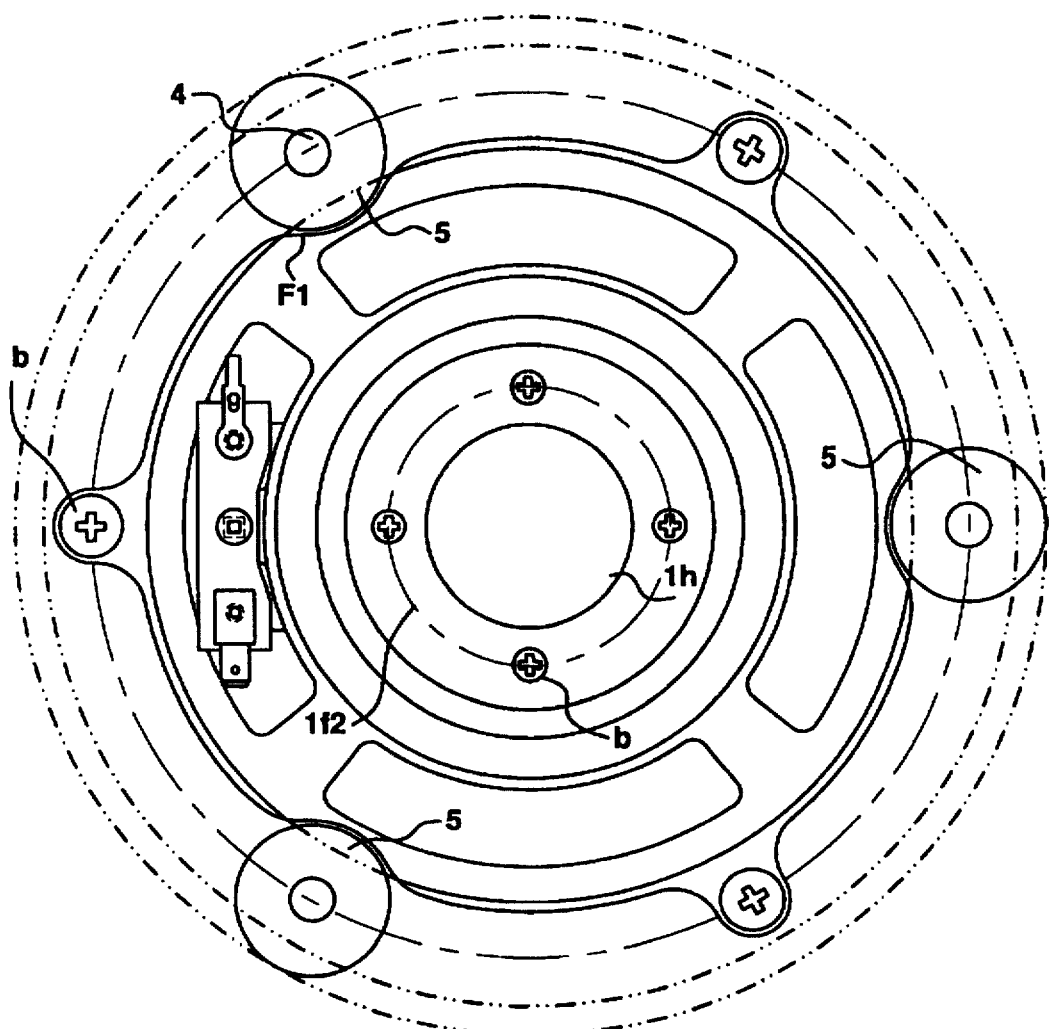
Figure 6A:
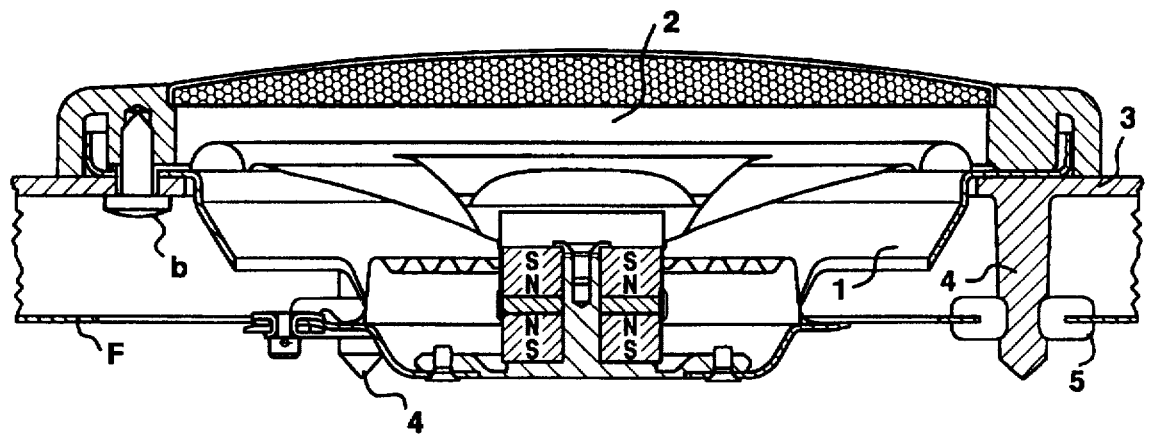
FIG. 6A is a cross sectional view showing the mount state of a speaker according another embodiment of the invention and FIG. 6B is a plan view of the mount state as viewed from the back of the speaker.
Figure 6B:
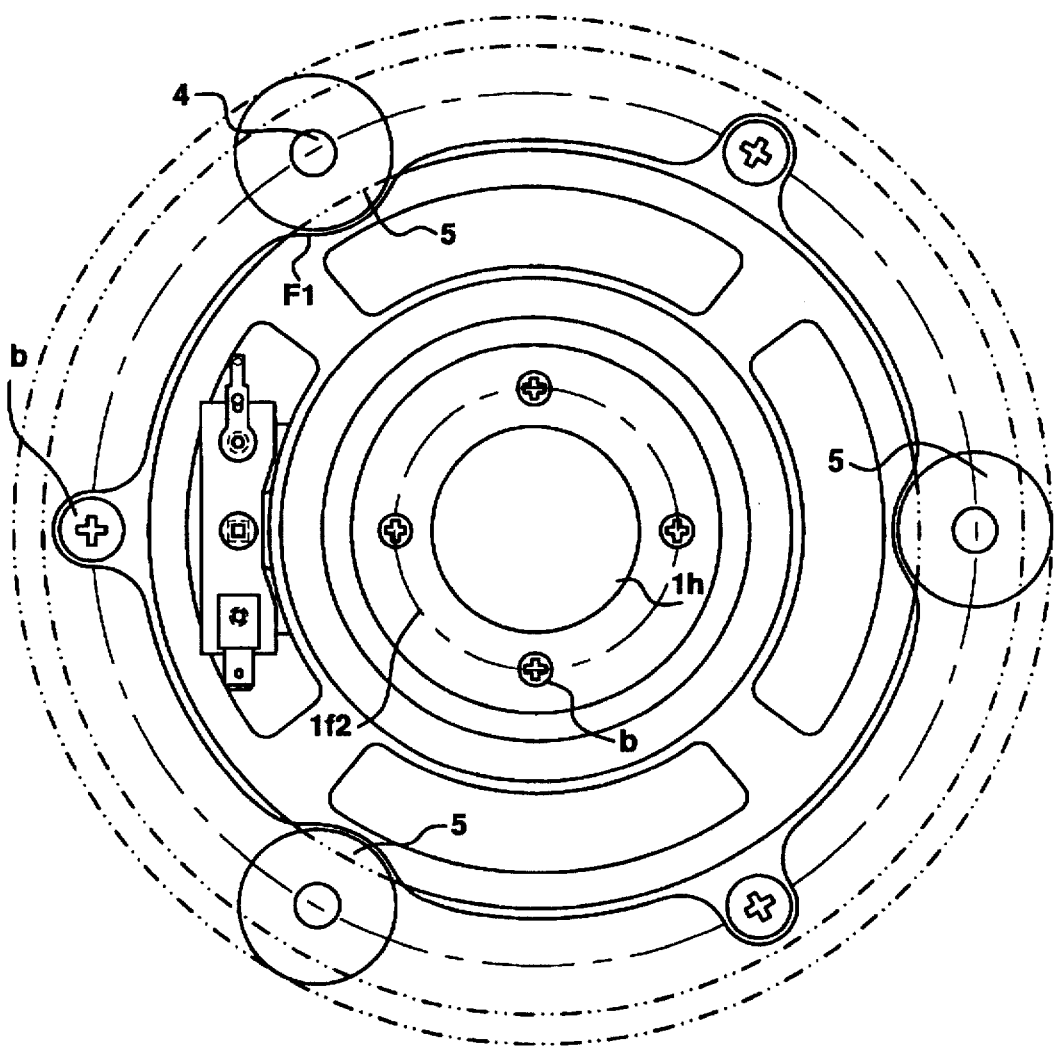
Figure 7A:
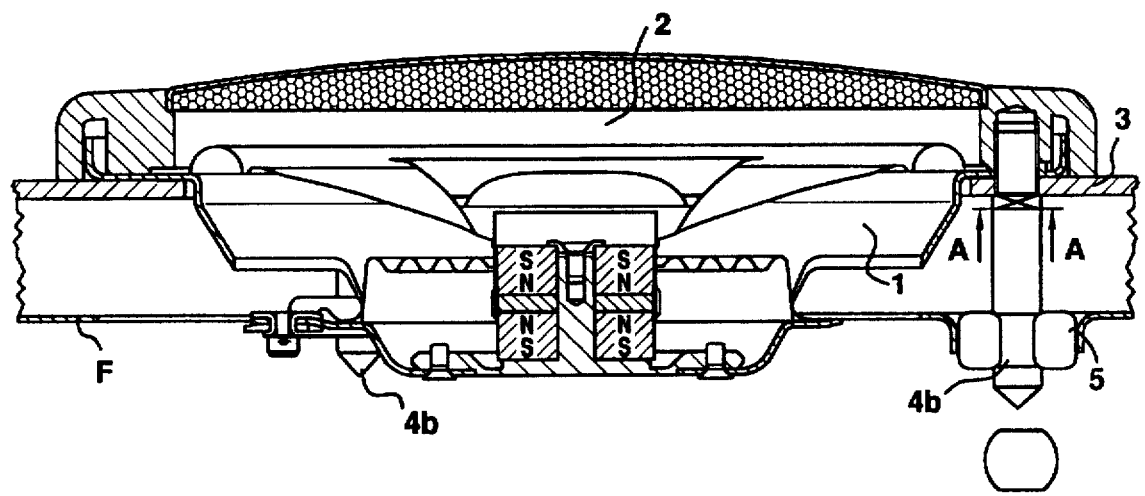
FIG. 7A is a cross sectional view showing the mount state of a speaker according to another embodiment of the invention and FIG. 7B is a plan view of the mount state as viewed from the back of the speaker.
Figure 7B:
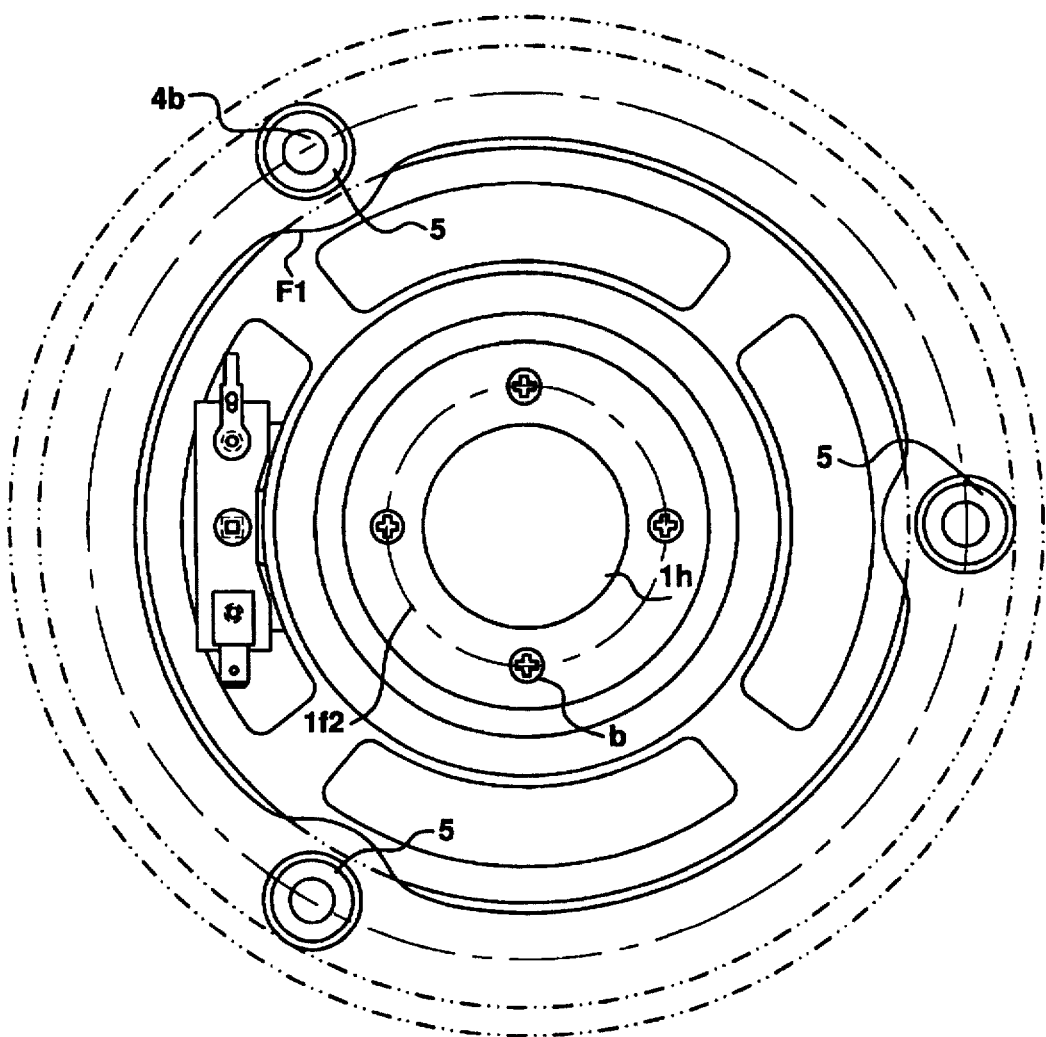

The magnet holder 1h is made of aluminum and has generally an inverted T-character shape in cross section as shown in FIG. 1B or 4B. The bottom of the magnet holder 1h is a holder flange 1h1 generally a disk shape having an outer diameter of 50 mm and a thickness of about 3 mm. At the center of the holder flange 1h1, a magnet guide pole 1b2 is formed which has a diameter of 5.95 mm and a height of 17 mm. Four tapped screw holes of M3 for mounting the magnet holder 1h on the frame bottom 1f2 are formed in the holder flange 1h1, radially at a pitch of 90 degrees and remotely from the center of the holder flange 1h1 by 45 mm. A step of 1 mm high as a frame guide is formed on the back of the holder flange 1h1, at the position of 32.6 mm diameter from the center of the holder flange 1h1.

In assembling the frame 1f and magnet holder 1h, rubber based adhesive is coated in a ring shape by about 0.3 g on the predetermined area near at the frame guide outer circumference of the holder flange 1h1 of the magnet holder 1b. While the frame guide is inserted into the frame bottom hole, the screw holes of the holder flanges 1h1 and the mount holes of the magnet holder 1h are aligned in position and the frame and magnet holder are pressed securely, and further as shown in FIG. 1B, the magnet holder 1h is fixed to the frame bottom 1f2 by threading flat head screws b from the frame bottom side. In this embodiment, although the screws b are used for mounting, other means may be used, or the frame and magnet holder may be formed integrally.

For the speaker 1 with the repulsion magnetic circuit of this embodiment, after the magnet guide 1h is mounted on the frame 1f, magnets 1Ma and 1Mb and a center plate 1p constituting the repulsion magnetic circuit are fitted around the magnet guide 1b2 at the center of the frame bottom 1f2. The magnets 1Ma and 1Mb are neodymium ring magnets having an outer diameter of 25 mm, an inner diameter of 6 mm, and a thickness of 8 mm, and are magnetized in the thickness direction.

As shown in FIG. 1B, the magnets 1Ma and 1Mb fitted about the magnet guide 1b2 of the magnet holder 1hface each other over the center plate 1p, with the N poles thereof being facing each other, i.e., with the center plate 1p being sandwiched between the N pole sides of the magnets 1Ma and 1Mb. The center plate 1p is made of iron and has a ring shape having an outer diameter of 25.43 mm, an inner diameter of 6 mm and a thickness of 3 mm. The center plate 1p is plated with zinc subjected to a so-called chromate process.

In this embodiment, although the repulsion magnetic circuit is fixed by screws b as shown in FIG. 1B, other means such as adhesive may also be used.

A cone type diaphragm 1c of the vibration system components is made of pulp and has a diameter of 135 mm inclusive its edge portion and a depth of about 13 mm. The diaphragm 1c has a hole of about 26 mm diameter generally called a neck at its central area for coupling to a voice coil 1v. The voice coil 1v has a bobbin of 0.1 mm thick made of FRP which is polyimide resin reinforced with glass fibers and generally called TIL. The voice coil 1v has a winding width of about 4.5 mm and a d.c. resistance of 3.4Ω. The voice coil 1v is mounted such that a constant clearance of about 0.26 mm is formed between the outer circumference of the center plate 1p and the inner circumference of the voice coil 1v.

A copper foil is adhered to the outer circumference of the voice coil bobbin at its predetermined area. A damper 1d is made of cotton cloth impregnated with phenol which is thermally molded and punched out. Two wires made of flat knitted tinsel wires are being sewn on the damper along corrugations. These vibration system components and magnetic circuit components are mounted on and assembled with the frame 1f.

Figure 2A:
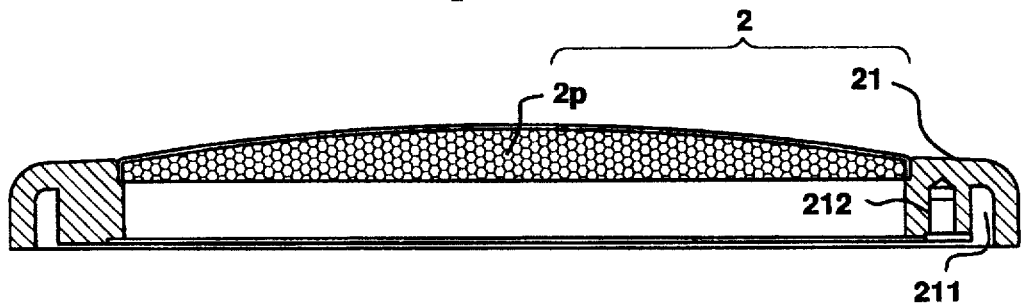
FIG. 2A is a cross sectional view of a grille of the embodiment and FIG. 2B is a plan view showing the back of the grille.
Figure 2B:
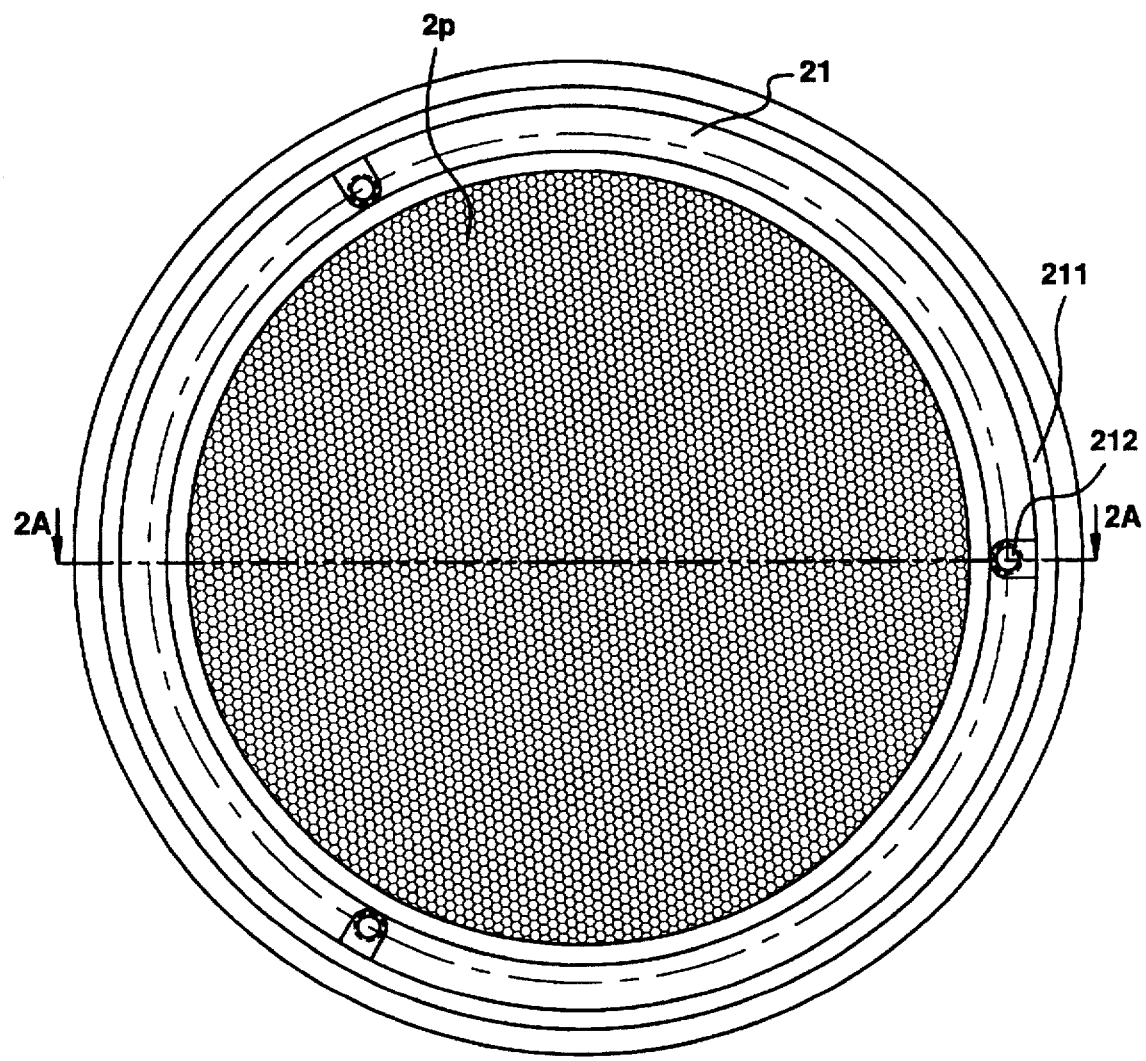

The speaker 1 of the embodiment described above has a weight of about 145 g and a mounting depth of 33. 6 mm. A grille 2 for the speaker 1 such as shown in FIGS. 2A–2B has a ring 21 made of black ABS resin and a punched metal 2p made of iron of 0.5 mm thick painted in black. The ring 21 has an outer diameter of 167 mm, an inner diameter of 130.4 mm, and a thickness of about 17 mm. Black rubber based adhesive is coated on the inner circumference of the resin ring 21 by about 1.3 g, a fall bent portion formed at the outer circumference of the punched metal 2p is inserted along the inner circumference of the resin ring 21 to thereby adhere them together.

A ring groove 211 is formed in the ring 21 near at the outer circumference on the bottom side, i.e., on the side to be contacted with the flange 1f1 of the speaker frame 1f. The protrusion formed at the outer circumference of the flange 1f1 is inserted into this groove 211. This groove 211 has an inner diameter of 151.5 mm, an outer diameter of 159 mm, and a depth of about 10.3 mm. Three tapped screw holes 212 of M5 for the mount on the speaker 1 are radially formed on the bottom side of the ring 21 at a pitch of 120 degrees and remotely from the center by 142 mm.

In this embodiment, rubber based adhesive is coated on the frame flange 1f1 of the speaker 1 at its predetermined area by about 1.4 g to adhere the grille 2 and the speaker 1 together by aligning in position the screw holes of the grille 2 and the mount holes 1f3 of the frame 1f. After the grille 2 is mounted on the speaker frame 1f, the speaker 1 with the grille is mounted on a door panel 3. The grille 2 may be mounted on the speaker frame 1f at a different time, depending upon the manufacture process, a production state, or the like. For example, the grille 2 may be mounted at the time when the speaker 1 is mounted on the door panel 3.

In order to mount the speaker 1 with the grille on the door panel 3, the door panel 3 is formed with a hole 31 at a desired area thereof and three speaker fixing holes 32 having a diameter of 6 mm. The hole 31 is generally called an opening and has a diameter of 128 mm. The holes 32 correspond to the mount holes 1f3 of the speaker 1 and are radially formed at a pitch of 120 degrees and remotely from the center of the hole 31 by 142 mm. The holes 32 are aligned in position with the mount holes 1f3 formed in the frame flange 1f1 of the speaker 1 so that the screw holes 212 of the resin ring are also aligned in position. In this state, the speaker 1 is fixedly mounted on the door panel 3 by using fixing screws 4b from the back of the panel 3. The fixing screws 4b each have a specific shape as shown in FIG. 3.

The fixing screw 4b will be described with reference to FIG. 3. The fixing screw 4b is basically an iron rod having a diameter of 7.3 mm and a length of about 40.3 mm. The fixing screw 4b has a threaded portion 4b1 of M5 (an effective threaded portion is 10 mm long) at the lower end thereof, a flange portion 4b2 having a diameter of 12 mm and a thickness of 2 mm at the upper end of the threaded portion 4b1, a circular cylinder portion upright from the flange portion 4b2 having a diameter of 7.3 mm and a length of about 28.3 mm, and a spherical portion 4b4 at the top end having a radius of 2 mm. The upper end portion below the spherical portion has a circular cone of 90 degrees in section as shown in FIG. 3. A step portion 4b3 having a depth of 1 mm and a width of 6 mm is formed starting from the position lower (left side in FIG. 3) by 3 mm than the lower end of the circular cone. As shown in the cross section taken along line A-A' shown in FIG. 4A, the flange portion 4bs is partially cut to form a flat portion having a width of 10 mm which is generally called a spanner guide.

In the mount state that the speaker 1 is fixedly mounted on the door panel 3 by the fixing screws 4b from the back of the panel 3, the frame 1f of the speaker 1 is squeezed by the grille 2 and the door panel 3, with three support shafts 4 having a length of about 30 mm and a diameter of 6 mm being provided on the back of the door panel 3. As the door panel 3 with the speaker 1 is mounted on the door, the support shafts 4 may abut against an iron door plate F or the bottom 1f2 of the speaker 1 may contact with or abut against the iron door plate F, depending upon the type of vehicles. In such a case, it is impossible to mount the door panel 3 on the door.

Figure 3:
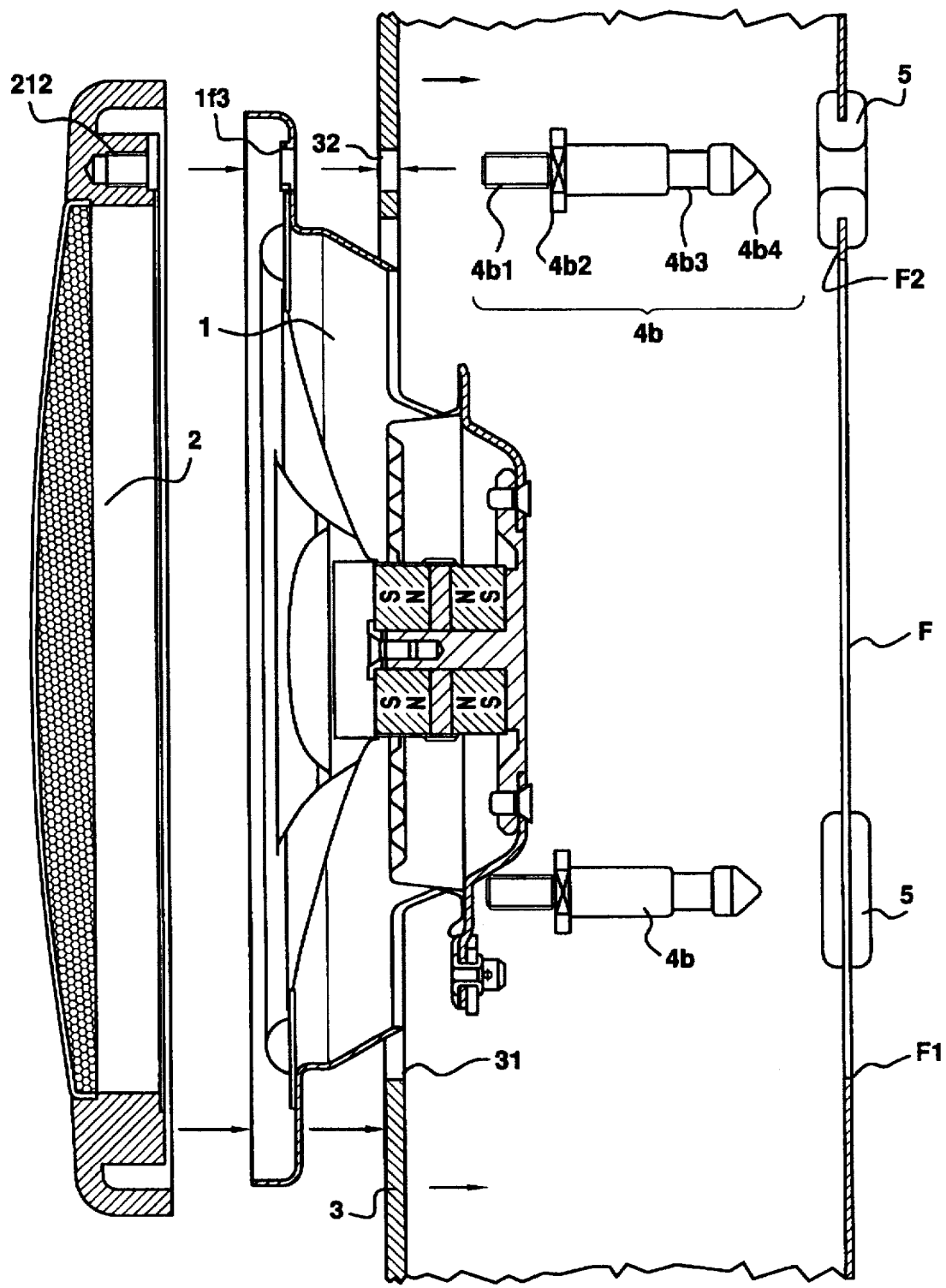
FIG. 3 is a cross sectional view showing the positional relationship between components of the speaker of the embodiment before it is mounted.

In this embodiment, therefore, three holes F2 of about 14 mm diameter are formed in the iron door plate F at the positions corresponding to the support shafts 4, and rubber bushes are fitted in the holes F2 as a cushioning member 5 as shown in FIGS. 3 and 4A–4B. Furthermore, an opening F1 such as show in FIGS. 4A–4B is formed in the iron door plate F at the area inside of the rubber bushes retracting from the mount areas of the rubber bushes. This opening F1 prevents the bottom 1f2 of the speaker 1 from contacting the iron door plate F, increases the apparent cavity capacity, and alleviates a back pressure applied from the diaphragm when a signal is input to thereby suppress the generation of kinky sounds or the like as much as possible.

In the state that the door panel 3 with the speaker 1 is mounted on the door, the spherical portion 4b4 and its adjacent portion at the top end portion of each fixing screw 4b, i.e., support shaft 4 extend through the iron door plate F, the step portion 4b3 of each fixing screw 4b, i.e., the support shaft 4 is borne by the cushioning member 5 of the rubber bush, and the support shaft 4 is coupled to a partial area of the iron door plate F via the cushioning member 5. In the case of a general interior decorative panel 3 other than the door panel 3, the support shaft 4 is coupled to a partial area of a vehicle iron plate F.

Listening tests were made for the speaker 1 of this embodiment mounted on the vehicle and a speaker mounted on the door without support shafts 4 on the back side of the door panel 3 and fixed with binding screws of M5 having a length of 10 mm. The speaker without support shafts 4 on the back side of the door panel showed no practical problem when a small signal is input or music with less peak signals is played. However, under the other conditions, i.e., when a large signal is input or music with many peak signals during an input of general average signals is played, kinky sounds, resonance sounds, and the like were generated and the speaker was hard to be used in practice.

In the mount state of this embodiment, i.e., in the state wherein the support shaft 4 extending on the back side of the door panel 3 passes through the iron door plate F and couples to a partial area of the iron door plate F or vehicle iron plate F, via the cushioning member 5, it was confirmed that even when a large signal was input or music with many peak signals during an input of general average signals was played, kinky sounds, resonance sounds, and the like were scarcely generated and the listening allowable range was made considerably broad to allow practical use of this speaker.

In the above embodiment, the fixing screw 4b functions as the support shaft 4. The support shaft 4 may be integrally formed with a resin grille 2, a resin interior decorative panel 3, or a door panel 3, as shown in FIGS. 5A–5B and 6A–6B. If the support shaft 4 is difficult or impossible to be integrally formed, it may be mounted as a discrete component. For example, in the case of the speaker frame made of press molded aluminum plate, the support shaft 4 is mounted as a discrete component, and in the case of a speaker frame made of die casting, the support shaft 4 is integrally formed with the speaker frame.

In this embodiment, the cushioning member 5 of a rubber bush or the like is provided on the side of the iron door plate F or vehicle iron plate F at the junction point between the support shaft 4 and iron door plate F or vehicle iron plate F. The cushioning member 5 made of rubber or the like may be provided on the side of the support shaft 4 such as shown in FIGS. 4A–4B, with similar advantageous effects being expected. The mount structure of this embodiment is very effective not only for an aluminum press frame but also for general light weight speakers.

Figure 8A:
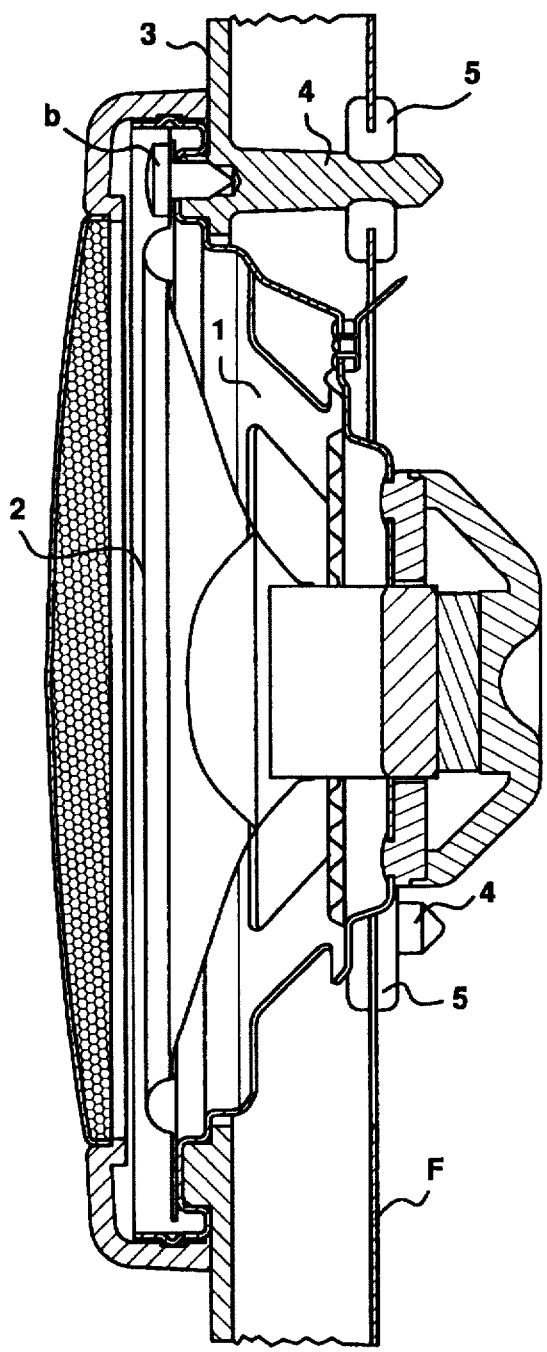
FIGS. 8(A) and 8(B) are cross sectional views is a cross sectional view showing the mount state of a speaker according to another embodiment of the invention.
Figure 8B:
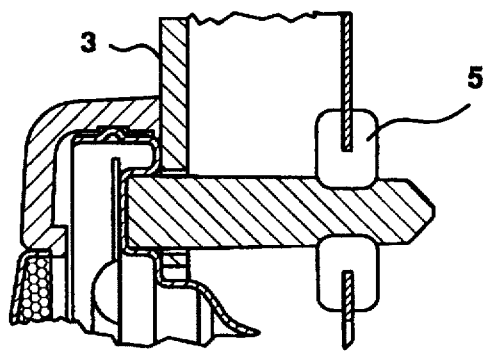
Figure 9:
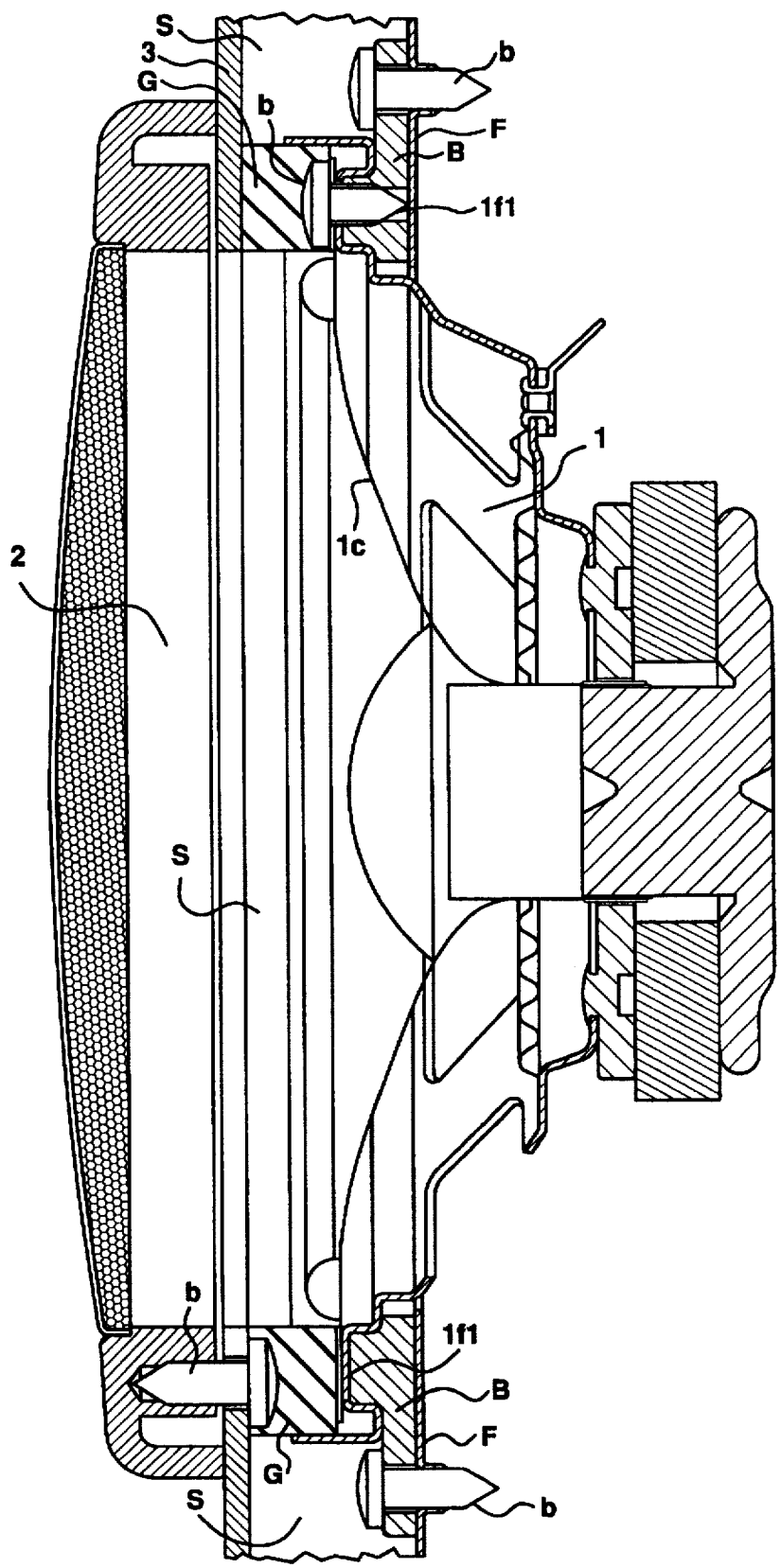
FIG. 9 is a cross sectional view showing the mount state of a conventional speaker.

For example, a speaker having a weight of about 200 g to 350 g with a compact magnetic circuit using neodymium magnets and an iron frame whose weight is reduced by 50% to 60% can be mounted directly on the panel as shown in FIG. 8 without any deformation of the frame. It was also confirmed that kinky sounds, resonance sounds, and the like were hardly generated and the speaker was sufficiently resistant to shocks upon door open/close or during running. In this embodiment, the speaker is mounted on the door panel. It may also be mounted on general interior decorative panels.

The following advantages can be obtained by the speaker mount structure of vehicles of this invention. The support shaft 4 coupling the door panel or interior decorative panel 3 and the iron door plate or vehicle iron plate F efficiently reinforces the strength of the panel 3. Therefore, even if the speaker 1 is mounted on the door panel or interior decorative panel 3, it is possible to obtain the strength of the panel 3 sufficient for supporting the weight of the speaker 1 and to prevent resonance of the thin panel 3 and kinky sounds or the like.

The cushioning member 5 of rubber or the like is provided on the iron door plate or vehicle iron plate so that errors of the positions and sizes of the support shafts 4 and the holes formed in the iron door plate or vehicle iron plate can be absorbed. It is therefore very easy to perform position alignment between the door panel or interior decorative panel 3 and the door or vehicle iron plate, reducing the number of manufacture processes. Deformation of the cushioning member 5 leads to a change in rigidity of the panel and shifts the resonance frequency of the panel, further reducing kinky sounds.

The frame $1f$ of the speaker 1 is squeezed between the grille 2 and the door panel or interior decorative panel 3 so that local pressure applied to the flange $1f1$ of the frame $1f$ is dispersed and deformation of the frame $1f$ is prevented. Therefore, even a speaker 1 with a frame $1f$ easy to be deformed, such as an aluminum press frame or thin and light iron press frame, can be mounted without any deformation.

What is claimed is:

1. A speaker mount structure for a vehicle including a vehicle frame plate, a vehicle interior decorative panel disposed generally in parallel with and spaced from the vehicle frame plate, and a speaker mounted on the vehicle interior decorative panel, comprising:

means for making said speaker frame flange in contact with and fixed to said interior decorative panel; and means for mechanically coupling at least one area of said interior decorative panel in contact with said speaker frame flange to one area of said vehicle frame plate.

2. A speaker mount structure according to claim 1, wherein said coupling means is a support shaft one end of which is coupled to said interior decorative panel and the other end is coupled to said vehicle frame plate.

3. A speaker mount structure according to claim 2, wherein the other end of said support shaft is coupled via an elastic member to said vehicle frame plate.

4. A speaker mount structure according to claim 3, wherein said elastic member is a ring rubber bush fitted on an opening formed in said vehicle frame plate and the other end of said support shaft is inserted into a hole of said rubber bush.

5. A speaker mount structure according to claim 1, further comprising a front grille having a peripheral edge portion corresponding to said speaker frame flange, wherein said speaker frame flange is inserted between said grille peripheral edge portion and said inner decorative panel.

6. A speaker mount structure according to claim 5, wherein said grille peripheral edge portion, said speaker frame flange, and said interior decorative panel are integrally fixed by screws.

7. A speaker mount structure according to claim 6, wherein said screw is formed on the one end of said support shaft and the other end of said support shaft is coupled to said vehicle frame plate.

8. A speaker mount structure according to claim 7, wherein the other end of said support shaft is coupled via an elastic member to said vehicle frame plate.

9. A speaker mount structure according to claim 5, wherein said grille peripheral edge portion includes a projection-shaped support shaft at a predetermined area thereof, said projection-shaped support shaft extending through an opening of a frame of said speaker and an opening of said interior decorative panel, and an end of said projection-shaped support shaft being coupled to said vehicle frame plate.

10. A speaker mount structure according to claim 1, wherein said interior decorative panel includes a projection-shaped support shaft at a predetermined area thereof, an end of said projection-shaped support shaft being coupled to said vehicle frame plate.

11. A speaker mount structure according to claim 1, wherein said speaker frame flange includes a projection-shaped support shaft, an end of said projection-shaped support shaft being coupled to said vehicle frame plate.

12. A speaker mount structure according to claim 1, wherein said coupling means is a support shaft with a threaded portion being formed at one end portion thereof.

13. A speaker mount structure according to claim 1, wherein said interior decorative panel is a plastic panel and said vehicle frame plate is an iron plate.

14. A speaker mount structure according to claim 1, wherein said speaker is a repulsion type loud speaker.

* * * * *